(12) United States Patent
Seifert et al.

(10) Patent No.: US 6,603,534 B2
(45) Date of Patent: Aug. 5, 2003

(54) LASER RANGE FINDER FOR LARGE RANGES OF MEASUREMENT WITH A SPECIAL RECEIVER

(75) Inventors: Helmut Seifert, Serba (DE); Gero Schusser, Bürgel (DE); Ullrich Krüger, Milda (DE); Martin Penzold, Jena (DE)

(73) Assignees: Jenoptik Laser, Optik, Systeme GmbH, Jena (DE); Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/976,141

(22) Filed: Oct. 12, 2001

(65) Prior Publication Data

US 2002/0093638 A1 Jul. 18, 2002

(30) Foreign Application Priority Data

Oct. 13, 2000 (DE) .......................................... 100 51 302

(51) Int. Cl.[7] .............................. G01C 3/08; G01C 3/00

(52) U.S. Cl. ...................... 356/4.01; 356/3.08; 396/106
(58) Field of Search ............................... 356/4.01–5.15, 356/3.08; 396/106

(56) References Cited

U.S. PATENT DOCUMENTS

| | | | |
|---|---|---|---|
| 4,907,026 A | * | 3/1990 | Koyama et al. |
| 5,949,531 A | | 9/1999 | Ehbets et al. |
| 6,055,041 A | * | 4/2000 | Matsumoto et al. ........ 356/3.08 |
| 6,281,968 B1 | | 8/2001 | Seifert et al. |

* cited by examiner

Primary Examiner—Stephen C. Buczinski
(74) Attorney, Agent, or Firm—Collard & Roe, P.C.

(57) ABSTRACT

A laser range finding device is shown which contains a transmitting channel and a receiving channel. The transmitting channel includes a transmitting lens and a laser light, which is positioned at a focal point of the transmitting lens. The receiving channel includes a receiving lens and a photodiode chip array arranged at a focal point of the receiving lens. The photodiode chip array includes a perforated shutter having at least two shutter apertures.

6 Claims, 4 Drawing Sheets

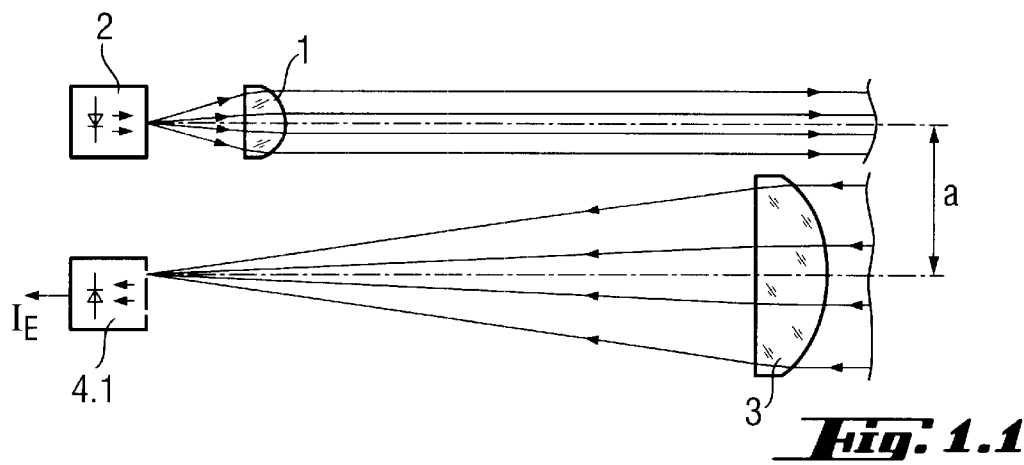
Fig. 1.1
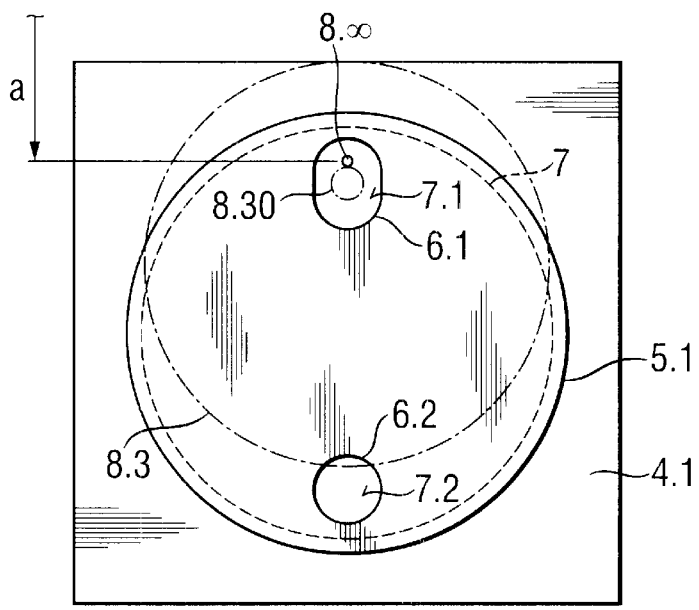
Fig. 1.2
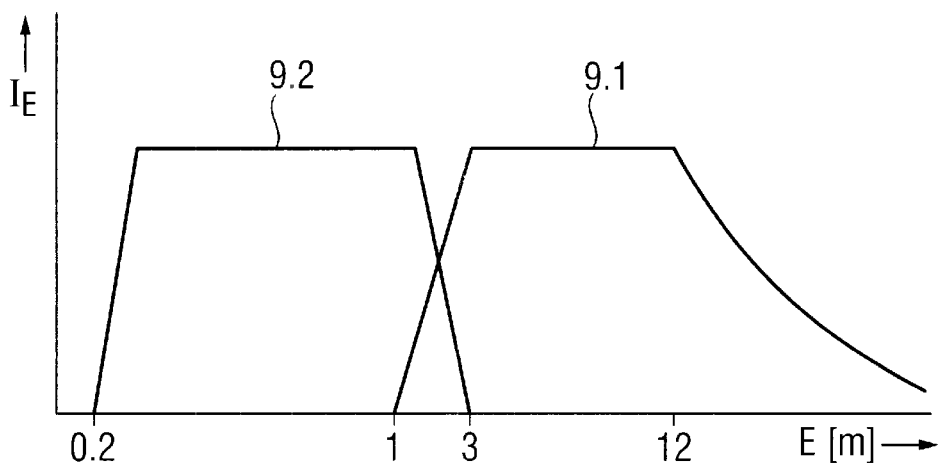
Fig. 1.3

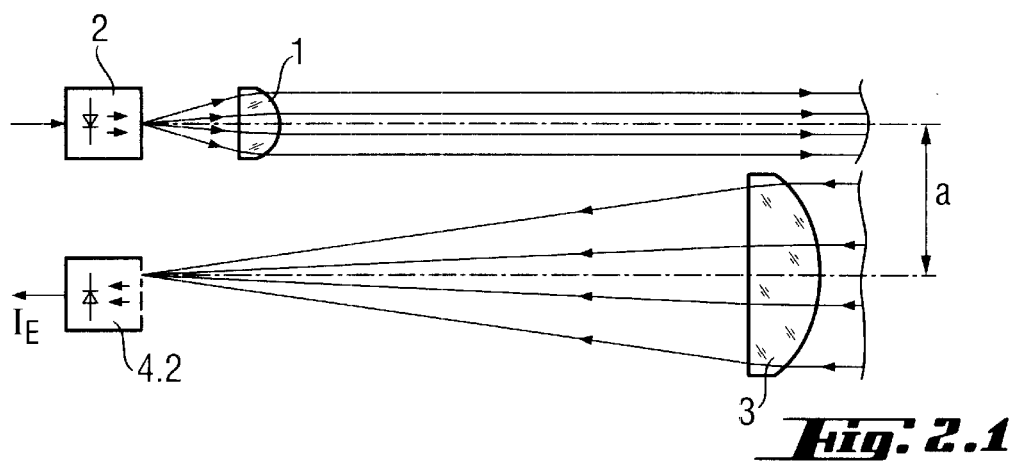
Fig. 2.1
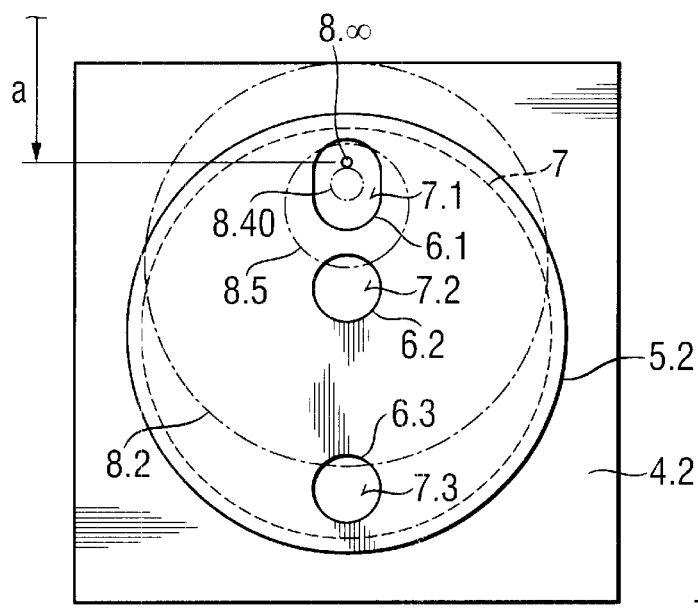
Fig. 2.2
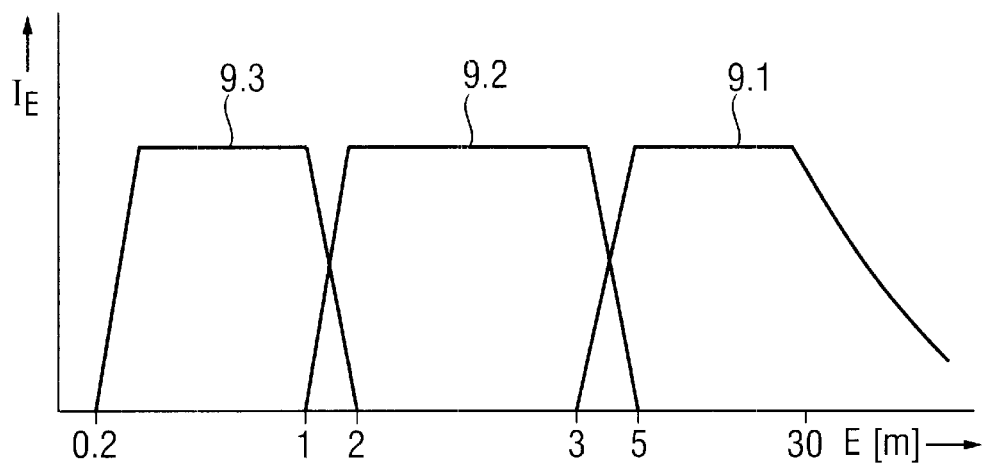
Fig. 2.3

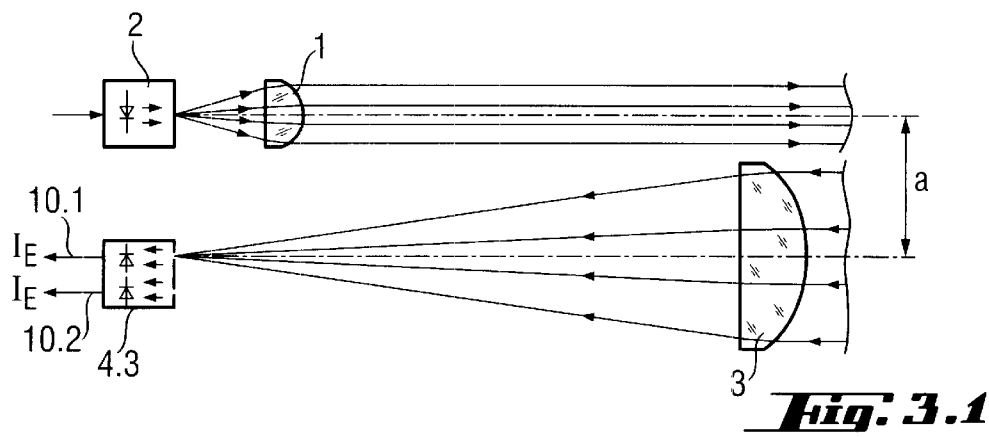
Fig. 3.1
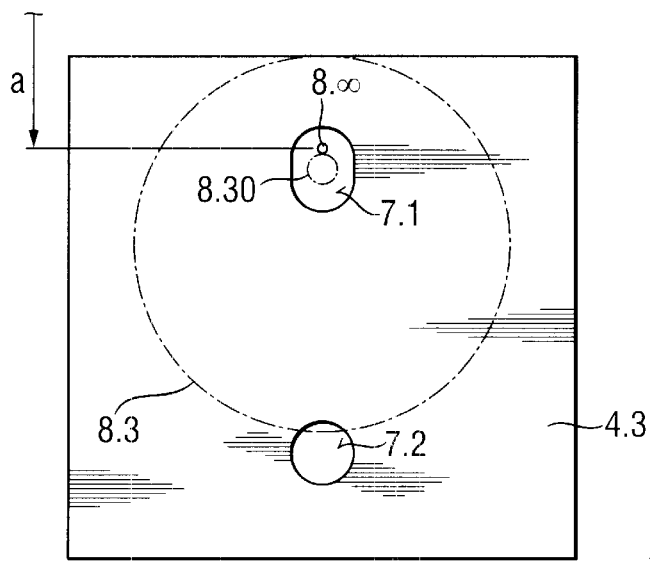
Fig. 3.2
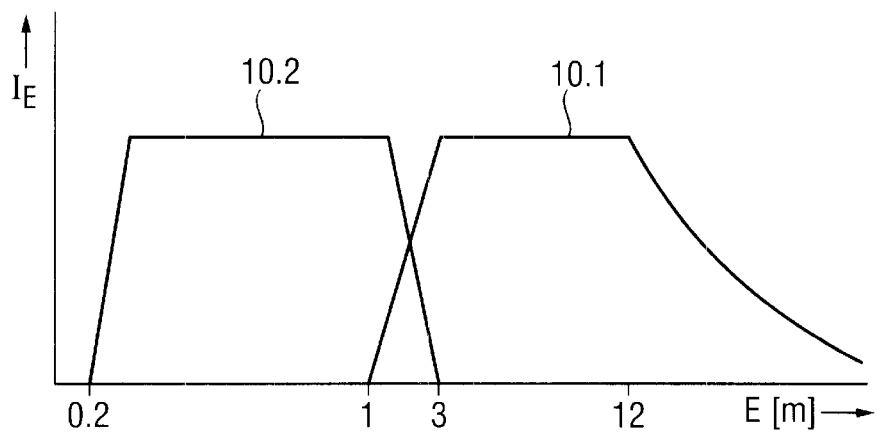
Fig. 3.3

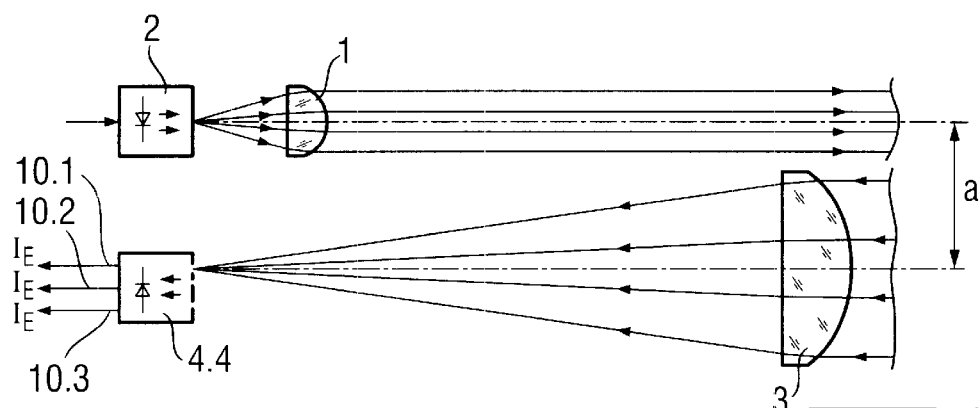
Fig. 4.1
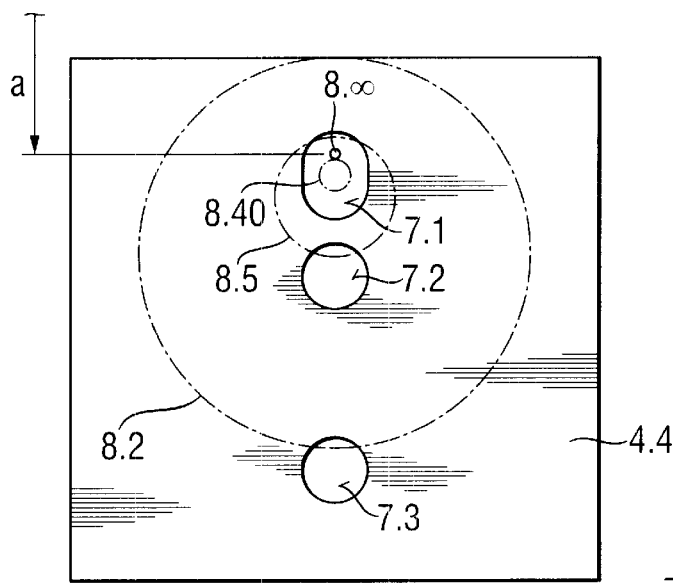
Fig. 4.2
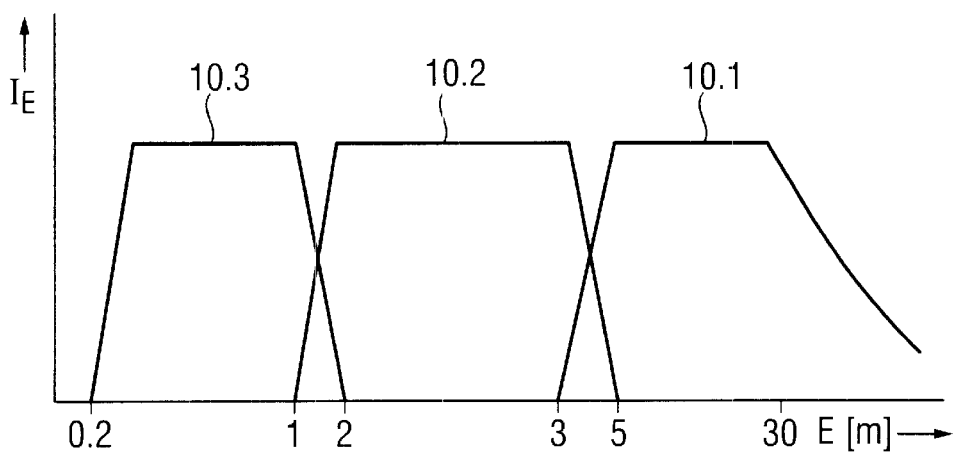
Fig. 4.3

LASER RANGE FINDER FOR LARGE RANGES OF MEASUREMENT WITH A SPECIAL RECEIVER

BACKGROUND OF THE INVENTION

The invention relates to laser range finders that are based on the principle of measuring a pulse transit or phase transit time.

THE PRIOR ART

Laser range measuring devices that are known in the prior art are based on measuring the transit time of the pulse or the transit time of the phase that can be distinguished from one another by a basic arrangement of the transmitting and receiving channels. This occurs by dividing these range finders in devices wherein the transmitting channel is arranged next to the receiving channel. Thus, the optical axes of these channels extend parallel to each other with a defined spacing from each other. These devices have transmitting and receiving channels that are arranged coaxially with each other, so that their optical axes coincide.

In the measurement of objects, the optical "cross talk" of the receiver which can be caused, by back scatter of dust articles at close range, can be optically reduced only by two measures: by reducing the receiver surface and by increasing the axial spacing between the transmitting channel and the receiving channel.

However, when the distance of the object is reduced, the effect of both measures is that the beam of measuring rays reflected by the object migrates away from the receiver more rapidly.

For range finding devices that are solely designed for close range viewing, these devices comprise coaxial transmitting and receiving channels. Thus, the transmitting lens, which also may also be an individual lens, represents the receiving lens as well. A beam divider is located within the focal length of this object, which produces the focal plane of the lens in two planes that are conjugated in relation to one another. The transmitter is located in these focal planes, on the one hand, and the receiver on the other. Thus, the measuring radiation emitted from the transmitter is collimated by the lens, reflected by the object, and is always reproduced on the receiver irrespective of the distance of the object.

This arrangement is suited for close ranges because of the relatively high intensity of the measuring radiation reflected back by the object to the receiver. Thus, the following characteristics are present:

the opening angle of the lens, optimized for emitting the beam of measuring rays, is adequate for receiving the reflected measuring radiation;

the dynamic range of the receiver is adjusted so that a reflection of the measuring radiation is not detected on dust particles; and a loss of intensity on account of the beam divider poses no problems.

This arrangement is unsuitable for range finders designed to view in a far range because of the low intensity of the reflected measuring radiation of the desired object and the relatively high intensity of reflected radiation at close range. This result is caused by the reflection on optical structural elements such as the beam divider, the lens, and dust particles.

Therefore a parallel arrangement should be used for range finding devices for the far range, wherein the object to be measured is present at a distance that is infinite for the receiving lens, which also may be an individual lens. The measuring spot produced on the object to be measured, which is always coming from the infinite, is reproduced in the focus of the receiving lens. The transmitter and the receiver do not have to be arranged in two planes that are conjugated in relation to each other. This improvement permits the separation of the transmitting and receiving channels.

This arrangement is suitable for object distances in the far range because the relatively low intensity of the measuring radiation reflected by the object to the receiver. The following characteristics necessarily apply:

The opening angle of the receiving lens can be selected larger than the opening angle of the transmitting lens;

the dynamic range of the receiver can be adjusted so that a reflection of the measuring radiation on dust particles would be detected if these components of the radiation were to impact the receiver. This is avoided by the spacing between the optical axes of the transmitting and receiving channels and by a small receiver surface; and a beam divider causes no additional loss of intensity.

This arrangement is unsuitable for measuring objects in the near range because of the resulting parallax, wherein as the distance becomes shorter, and the reproduction of the measuring spot increasingly migrates away from the receiver arranged on the optical axis of the receiving lens.

The designs described above may make it seem difficult to design a range finding device that is suitable for an extensive range of distance measurements, such as for objects to be measured both in the near and far ranges.

The demand for such range finders exists, for example in the construction industry, where a distance measuring range of from 0.3 to 30 m is important.

For range finding devices with a wide range finding spectrum, only an arrangement with parallel transmitting and receiving channels can be used due to the reduction in intensity and the optical "cross talk" occurring in connection with the coaxial arrangement.

Such arrangements are disclosed in EP 0 701 702 and DE 198 60 464.

With the laser range finder described in EP 0 701 702, two basically different solutions are offered so that the measuring spot is always reproduced on the receiver. In the present case the measuring spot is produced on the inlet surface, in the near range as well.

This result may take place, on the one hand, by letting the light conductor inlet surface trail transversely to the optical axis in accordance with the displacement of the reproduction position of the measuring spot. As stated above, no complete follow-up intentionally takes place along the optical axis because it was found that follow-up in the concrete reproduction position leads to over controlling on the part of the evaluation electronics. Thus, the dynamic range of the control electronics of the receiver is exceeded.

On the other hand, the light conductor inlet surface can be arranged in a fixed manner. In addition, with short object distances, an optical deflecting means should be arranged outside of the optical axis, so that the measuring rays incident upon the receiving lens are deflected toward the light conductor inlet area in an increasingly slanted manner. In addition, it is assumed that correct deflection by the reproduction optics is not important because no intensity problems exist with object distances in the near range. The second-mentioned variation offers the advantage that it can make do without mechanically movable elements in the receiving channel.

However, it has the drawback that it is hardly possible to adapt the signal level, to the dynamic range of the receiver. The signal level is the intensity of the measuring radiation reflected by the object and impacting the receiver.

The range of the distance measurement is limited by the sensitivity range (dynamics) of the receiver when it is assured that part of the measuring radiation reflected on the object impacts the receiver surface.

The radiation intensity impacting the receiver area is substantially determined by the following features:

the transmitting capacity;

the intensity loss across the length of the radiation path which is equal to twice the distance to the object; and the aperture range effective in the given case, such as the proportion of the surface area of the receiving lens that becomes effective in the given case for reproducing the reflected measuring radiation.

In German Patent DE 198 60 464, a different aperture range is effective depending on the distance of the object to avoid over controlling of the receiver. This is accomplished with the help of a special design of the receiving lens.

The receiving lens is a modified receiving lens with two focal points on the picture side. These two focal points are produced so that the receiving lens comprises a primary lens area and a secondary lens area. The secondary area of the lens extends across the entire diameter of the receiving lens stretched in the vertical direction in relation to the transmitting axis, and has a shape that becomes narrower toward the transmitting axis.

The two areas of the lens are designed so that the receiver receives a reflection signal disposed within the sensitivity range of the receiver across its entire desired distance range. However, the manufacture of such a receiving lens is difficult and it is very costly. The solutions offered by the prior art are similar in that they effect the reproduction of the measuring radiation on the receiver with an intensity that is suitable for the receiver with the help of measures that influence the guidance of the beam and require either costly optical or additional mechanical subassemblies.

SUMMARY OF THE INVENTION

The invention is based on the problem of providing a laser range finder for large ranges of measurement, so that the reproduction of the measuring radiation on the receiver occurs through a special embodiment of the receiver itself, with an intensity that is suitable for the receiver.

The goal is to reduce the cost for the manufacture of the optics, the assembly, the adjustment and the testing.

Furthermore, it is also an object of the invention to provide a laser range finding device for large ranges of measurement with high measuring accuracy and measuring speed.

Moreover, another object is to make it possible for a laser range finder to be produced with a smaller size than those known in the prior art.

This problem is solved by providing a photodiode chip arrangement in the form of a receiver that comprises at least two active photodiode surfaces arranged in a straight line. The alignment of this arrangement is determined by the spacing "a" between the axes of the transmitting and the receiving lenses, and whereby the active photodiode surface arranged closest to the laser light source is located with spacing "a" from the laser light source.

As no optical deflecting means are required, the receiving lens can be designed with a very short focal length (about 15 to 25 mm) in the form of an individual lens or an individual sphere. This design, in turn, permits the device to operate with very small photodiode receiver surfaces, which leads to a reduction of the dark current as well as a reduction of the capacities of the photodiodes. A reduction of the dark current increases the overall sensitivity of the laser range finder. A reduction of the capacity of the photodiodes permits a proportional increase in the modulation frequency and thus an increase of the measuring accuracy and a reduction of the measuring time.

BRIEF DESCRIPTION OF THE DRAWINGS

Other objects and features of the present invention will become apparent from the following detailed description considered in connection with the accompanying drawings, which disclose three embodiments of the present invention. It should be understood, however, that the drawings are designed for the purpose of illustration only and not as a definition of the limits of the invention.

In the drawings wherein similar reference characters denote similar elements throughout the several views:

FIG. 1.1 shows a sketch of the optical principle for a laser range finding device comprising a photodiode chip array determined by a two-hole shutter;

FIG. 1.2 is a representation of a photodiode chip array with a two-hole shutter;

FIG. 1.3 shows the receiving current IE of the photodiode chip array according to FIG. 1.2 as a function of the distance E;

FIG. 2.1 is a sketch of the optical principle for a laser range finding device determined by a three-hole shutter;

FIG. 2.2 is a representation of a photodiode chip array with a three-hole shutter;

FIG. 2.3 shows the receiving current IE of the photodiode chip array according to FIG. 2.2 as a function of the distance E;

FIG. 3.1 is a sketch of the optical principle of a laser range finding device comprising a photodiode chip array determined by an arrangement of two photodiodes;

FIG. 3.2 is a representation of a photodiode chip array comprising an arrangement of two photodiodes;

FIG. 3.3 shows the receiving current IE of the photodiode chip array according to FIG. 3.2 as a function of the distance E;

FIG. 4.1 shows a sketch of the optical principle for a range finding device comprising a photodiode chip array determined by an arrangement of three photodiodes;

FIG. 4.2 is a representation of a photodiode chip array comprising an arrangement of three photodiodes; and FIG. 4.3 shows the receiving current IE of the photodiode chip array as a function of the distance E.

DETAILED DESCRIPTION

Referring in detail to the drawings, the basic structure of the range finding device described in the following with the help of FIG. 1.1 is common to all of the following exemplified embodiments.

The range finding device comprises a transmitting channel with a transmitting lens 1 and a laser light source 2, which is arranged in the focal point of transmitting lens 1. A receiving channel comprising a receiving lens 3 and a photodiode chip array arranged in the focal plane of receiving lens 3 is present parallel with the transmitting channel with a spacing "a" (equal to the spacing between the optical axes of the transmitting and receiving lenses).

The beam emitted by laser light source 2 is collimated via transmitting lens 1, which impacts the object to be measured, and is then reflected by the object. The radiation impacting receiving lens 3 creates a receiving current IE, which is the receiving signal, depending on the distance of the object and the concrete design of the photodiode chip array in the given case.

In the first embodiment, which is explained with the help of FIGS. 1.1, 1.2 and 1.3, a photodiode chip array 4.1 is formed by a two-hole shutter 5.1. Shutter 5.1 has a first shutter aperture 6.1 and a second shutter aperture 6.2. Chip array 4.1 also includes a photodiode with a photodiode surface 7. This photodiode is located downstream of these apertures in the direction of radiation. Photodiode surface 7 is covered except for two partial areas determined by the two shutter apertures 6.1 and 6.2. The two partial areas form a first and a second active photodiode surface.

Depending on the distance of the object to be measured, the radiation reflected is reproduced on photodiode array 4.1 with a reproduction circle with a different position and diameter. With an object at an infinite range, the radiation is focused in the focal point of receiving lens 3 and in this way leads to an almost dot-shaped reproduction circle 8.∞ with a spacing "a" from laser light source 2. First shutter aperture 6.1 is positioned in reproduction circle 8.∞ accordingly. In the present case, the entire reflected radiation impacts first active photodiode surface 7.1. When the distance is shorter, the reproduction circle becomes increasingly larger because the actual plane of the image moves away from the focal plane of receiving lens 3. Furthermore, the center point of the reproduction circle migrates away from laser light source 2 because the object to be measured is present on the optical axis of the transmitting lens 1 and thus located with spacing "a" from the optical axis of receiving lens 3.

FIG. 1.2 shows a reproduction circle 8.30 for an object at a distance of 30 meters, and a reproduction circle 8.3 for an object at a distance of only 3 meters.

The first shutter aperture 6.1 is dimensioned so that it partially shades the growing reproduction circle only when the intensity of the radiation impacting the active photodiode surface 7.1 reaches the upper limit of the dynamic range of the photodiode chip array.

If the reproduction circle continues to grow larger, this always leads to higher radiation intensity according to the law of distance. There is also an increasingly smaller proportion of the reproduction circle determined by the size of the first shutter aperture reproduced on the first active photodiode surface 7.1 and thus of photodiode surface 7, so that the receive signal remains nearly constant. Only when the reproduction circle has reached a size wherein the radiation component passing through the first shutter aperture 6.1 reaches the lower limit of the dynamic range of the photodiode chip array, does the second shutter aperture 6.2 start to act. Thus, the components of the radiation impact the second active photodiode surface 7.2 defined by the second shutter aperture 6.2. In summation, the radiation components impacting the active photodiodes 7.1 and 7.2 generate an approximately constant receive signal.

FIG. 3 shows the idealized curve of the receiving current 9.1 made possible by the first shutter aperture 6.1, and the receiving current 9.2 made possible by the second shutter aperture 6.2. For distances in excess of 12 meters, the signal decreases in the present exemplified embodiment according to the law of distance.

The selection of the size, shape and spacing of the shutter apertures is a question of optimization and is particularly dependent upon the parameters of photodiode 7 and the focal length of receiving lens 3. On the one hand, the shutter apertures should be as small as possible to prevent scattered light from impacting as best as possible. On the other hand, the first shutter aperture 6.1 has to be larger than the reproduction circles forming when the distance of the object is greater than 12 meters.

The shape of the shutter aperture in particular in the direction of distance "a" has an effect on the size of the areas of the reproduction circle shaded by the two-hole shutter 5.1. For example, as shown in FIG. 1.2, a long-stretching design of the first shutter apertures 6.1 are shaped, in the form of an oval that has the effect of a circular design. The center of a reproduction circle is shaded only at a lesser distance. It is also possible to have the shutter apertures extend in the form of optimized shapes such as a wedge.

When a photodiode with a more sensitive photodiode surface 7 is combined with a three-hole shutter 5.2 and a receiving lens with a larger aperture, the receiving signal can be maintained almost constant for a greater distance. This distance could be up to 30 meters, which is of great interest particularly for the construction industry.

FIGS. 2.1 to 2.3 show a photodiode chip arrangement 4.2 with a three-hole shutter 5.2 and wherein there are reproduction circles 8.∞ produced thereon with an infinite distance of the object Reproduction circle 8.40 is for a distance of the object of 40 meters; 8.5 for a distance of the object of 5 meters; and 8.2 for a distance of the object of 2 meters.

As in the first exemplified embodiment, the shutter apertures are arranged in a straight line in the present case as well, aligned in a direction determined by the spacing "a". Photodiode surface 7 is covered in the present embodiment with the exception of the three shutter apertures 6.1, 6.2 and 6.3 that define the active photodiode surfaces 7.1 to 7.3.

FIG. 2.3 shows the idealized curve of receiving current 9.1 effected by the first shutter aperture 6.1; the receiving current 9.2 effected by the second shutter aperture 6.2; and the receiving current 9.3 effected by a third shutter aperture 6.3.

The idea of the invention is not limited to the shown designs of the perforated shutters in the form of two-hole shutter 5.1 or three-hole shutter 5.2. The number, arrangement, shape and size of the shutter apertures are rather a question of optimization dependent upon the desired accuracy and the distance range of the laser range finding device, in conjunction with the parameters of the photodiode surface 7 and the receiving lens 3. However, excellent results are obtained even with a two-hole shutter 5.1 or a three-hole shutter 5.2. For a first exemplified embodiment of a photodiode chip array comprising a two-hole shutter 5.1, it is advantageously possible to combine a receiving lens 3 with a focal length of 25 mm and an aperture diameter of 20 mm, with a photodiode surface 7 with a diameter of 230 $\mu$m and with shutter apertures with a diameter of about 32 $\mu$m. Even smaller shutter apertures with a diameter of about 20 $\mu$m can be obtained with a photodiode chip array with a three-hole shutter according to the second exemplified embodiment, comprising a receiving lens with a focal length of 15 mm and an aperture diameter of 10 mm.

This clearly shows how small and compact a laser range finding device as defined by the invention can be realized combined with high efficiency.

The costs associated with the manufacture and application of the perforated shutters to the photodiode surface 7 are extremely low. The perforated shutters can be attached to commercially available photodiode chips or avalanche-type photodiode chips at a later time, or already as the front contact is being mounted.

Further favorable properties are achieved through the shutter openings of the attached perforated shutters that can be produced with a very small size. With such a solution, wherein only small components of the surface of the photodiode or avalanche-type photodiode are active, it is possible to avoid runtime errors in a targeted manner. This permits accuracy values in range finding operations of up to 1 mm, for which runtime differences of lower than 6 ps have to be detected.

As opposed to the prior art, it is particularly possible to use the entire radiation intensity with objects in the infinite because no losses are incurred because of beam division or beam guidance.

In a third embodiment, shown in FIGS. 3.1, 3.2 and 3.3, a photodiode chip arrangement 4.3 is formed with two photodiodes arranged on a common chip and connected to each other on a side of the anode or the cathode. These photodiodes each comprise a photodiode surface 7 representing the active photodiode surfaces 7.1 and 7.2.

Depending on the distance of the object to be measured, the radiation reflected by the object is reproduced on the photodiode chip array 4.3 with a reproduction circle with a varying position and diameter. With an object in the infinite range, the radiation is focused in the focal point of the receiving lens 3 and in this way leads to an almost dot-like reproduction circle 8.∞ with a spacing "a" from the laser light source 2. A first active photodiode surface 7.1 is located accordingly around reproduction circle 8.∞ and thus receives the entire reflected radiation. When the distance is reduced, the reproduction circle grows increasingly larger and shifts.

FIG. 3.2 shows a reproduction circle 8.30 for an object distance of 30 meters, and a reproduction circle 8.3 for an object distance of only 3 meters.

The first active photodiode surface 7.1 is dimensioned so that the growing reproduction circle is no longer completely reproduced only when the intensity of the radiation impacting the first active photodiode surface 7.1 reaches the upper limit of the dynamic range of the photodiode chip arrangement. When the reproduction circle is enlarged further, which according to the law of distance always leads to a higher radiation intensity, an increasingly lesser component of the reproduction circle takes effect, so that the receive signal remains nearly constant.

The reproduction size can grow so large that the component of the radiation impacting the first active photodiode surface 7.1 reaches the lower limit of the dynamic range of the photodiode chip array. Then the second photodiode 7.2 becomes active and with the reception of additional components of the radiation this photodiode supplies a receive signal that remains nearly constant.

FIG. 3.3 shows the idealized curve of the receiving current 10.1 effected by the first active photodiode surface 7.1, and the receiving current 10.2 effected by the second active photodiode surface 7.2. For distances greater than 12 meters, the signal diminishes in the present embodiment according to the law of distance.

The selection of the size, shape and spacing of the active photodiodes 7.1 and 7.2 is a question of optimization, and in particular, depends on their other parameters and on the focal length of receiving lens 3. On the one hand, lens 3 is to be as low as possible to prevent any impact of scattered light in the best way possible. However, the first active photodiode surface 7.1 has to be larger than the reproduction circles forming in connection with object distances in excess of 12 meters.

The shape of the surfaces of the photodiodes in the direction of the spacing "a" has an effect on the size of the areas of the reproduction circles overlapping the active photodiode surfaces. For example, a long-stretching shape, in the form of an oval as shown in FIG. 3.2, has the effect of a circular shape wherein the center of a reproduction circle will no longer overlap only with a lesser distance of the photodiode 7.1. It is also possible to have forms of optimization wherein the photodiode surfaces extend in the form of a wedge.

It is important that photodiode surfaces with different shapes are produced at the same time and identically as well, so that all their starting parameters are identical. Different surface shapes are realized by means of attached shutters.

In a fourth exemplified embodiment, there are three photodiodes each comprising a photodiode surface 7 forming the active photodiode surfaces 7.1, 7.2 and 7.3. These photodiodes are arranged on a chip and connected with one another, wherein there is used a receiving lens with a larger aperture, which can reduce the individual active photodiode surfaces 7.1 to 7.3 even further and the receiving signal can be maintained nearly constant for a greater distance. The distance can be for example a distance of up to 30 m as well, which is of great interest especially in the construction industry.

In FIGS. 4.1 to 4.3, such a photodiode chip array 4.4 is created with three photodiodes, which are arranged on a common chip and connected to each other on the side of the anode. These photodiodes show the reproduction circles 8.∞ at an infinite distance of the object; 8.40 at a distance of the object of 40 m; 8.5 at a distance of the object of 5; and 8.2 at a distance of the object of 2 m.

As in the third exemplified embodiment, the photodiodes are arranged also in a straight line aligned in a direction determined by the spacing "a".

FIG. 2.3 shows the idealized curve of the receiving current 10.1 effected by the first active photodiode surface 7.1; the receiving current 10.2 effected by the second active photodiode surface 7.2; and the receiving current 10.3 effected by a third active photodiode surface 7.3.

Even smaller and more compact range finding devices can be realized with the third and fourth exemplified embodiments.

Accordingly, while several embodiments of the present invention have been shown and described, it is obvious that many changes and modifications may be made thereunto without departing from the spirit and scope of the present invention.

What is claimed is:

1. A laser range finding device for measuring the distance of an object at a large measuring range comprising:
   a transmitting channel comprising:
      a transmitting lens disposed within said transmitting channel;
      a laser light source arranged at a focal point of said transmitting lens for producing a laser beam directed at the object; and
   a receiving channel arranged parallel to said transmitting channel with a spacing "a" from each other and comprising:
      a receiving lense disposed within said receiving channel;
      a receiving arrangement located in a focal plane of said receiving lens,
   wherein said receiver arrangement is a photodiode chip array comprising at least two active photodiode surfaces arranged in a straight line, with their alignment being determined by the spacing "a"; and wherein said active photodiode surface located closest to said laser light source is spaced from said laser light source with a spacing "a" so that said receiver arrangement can detect a laser beam sent from the transmitting channel and reflected off of the object to determine the distance of the object from the device by reading a size of a reproduction circle.

2. The laser range finding device for larger measuring ranges according to claim 1, wherein said active photodiode surfaces have a perforated shutter comprising at least two shutter apertures, said perforated shutter being arranged in front of said photodiode surfaces.

3. The laser range finding device for large measuring ranges according to claim 2, wherein said perforated shutter is a two-hole shutter.

4. The laser range finding device for large measuring ranges according to claim 1, wherein said shutter apertures are circular or oval or wedge-like shapes expanding in a direction of the straight line.

5. The laser range finding device for large measuring ranges according to claim 4, wherein said photodiode is an avalanche photodiode.

6. The laser range finding device for large measuring ranges according to claim 1, wherein said active photodiode surfaces each are formed by a photodiode with a photodiode surface, said photodiode surfaces being jointly produced on a chip and connected to each other on a side of said anode or a side of said cathode.

* * * * *